(12) United States Patent
Snyder et al.

(10) Patent No.: US 6,754,891 B1
(45) Date of Patent: Jun. 22, 2004

(54) DEBUGGER SYSTEM USING TRACEPOINTS FOR COMPUTER SOFTWARE

(75) Inventors: Michael Snyder, Palo Alto, CA (US); Jim Blandy, Bloomington, IN (US)

(73) Assignee: Red Hat, Inc., Durham, NC (US)

( * ) Notice: Subject to any disclaimer, the term of this patent is extended or adjusted under 35 U.S.C. 154(b) by 308 days.

(21) Appl. No.: 09/656,776

(22) Filed: Sep. 7, 2000

Related U.S. Application Data

(63) Continuation of application No. 09/144,184, filed on Aug. 31, 1998, now abandoned.

(51) Int. Cl.[7] .................................................. G06F 9/44
(52) U.S. Cl. .......................... 717/128; 714/35; 714/38; 717/129
(58) Field of Search ................................ 717/124, 128, 717/140, 151, 114, 129; 714/34, 35, 37, 38, 45

(56) References Cited

U.S. PATENT DOCUMENTS

| | | | |
|---|---|---|---|
| 4,205,370 A | 5/1980 | Hirtle ........................... 714/45 |
| 5,067,073 A | 11/1991 | Andrews ..................... 714/38 |
| 5,121,489 A | 6/1992 | Andrews ..................... 714/38 |
| 5,127,103 A | 6/1992 | Hill et al. ..................... 714/45 |
| 5,161,216 A | 11/1992 | Reps et al. .................. 717/151 |
| 5,414,855 A | 5/1995 | West ........................... 717/158 |
| 5,442,740 A | 8/1995 | Parikh ........................ 345/440 |
| 5,689,636 A | 11/1997 | Kleber et al. ................. 714/45 |
| 5,737,521 A | 4/1998 | Kleber et al. ................. 714/45 |
| 5,740,351 A | 4/1998 | Kasten ........................ 714/35 |
| 5,815,653 A | 9/1998 | You et al. ..................... 714/38 |
| 5,819,093 A | 10/1998 | Davidson et al. .......... 463/47.7 |
| 5,835,699 A | 11/1998 | Kimura ........................ 714/34 |
| 5,850,550 A | 12/1998 | Li et al. ...................... 717/154 |
| 5,870,606 A * | 2/1999 | Lindsey ...................... 717/128 |
| 5,892,941 A * | 4/1999 | Khan et al. .................... 703/22 |
| 5,896,536 A | 4/1999 | Lindsey ........................ 338/13 |
| 5,978,584 A | 11/1999 | Nishibata et al. ........... 717/134 |
| 6,042,614 A | 3/2000 | Davidson et al. ........... 717/116 |
| 6,161,216 A * | 12/2000 | Shagam ....................... 717/128 |
| 6,282,701 B1 * | 8/2001 | Wygodny et al. ........... 717/125 |
| 6,311,326 B1 * | 10/2001 | Shagam ....................... 717/128 |
| 6,526,567 B1 * | 2/2003 | Cobbett et al. .............. 717/124 |

FOREIGN PATENT DOCUMENTS

EP  1150466 A2 * 10/2001 ........... G06F/13/42

OTHER PUBLICATIONS

Zinky et al., "Visualizing packet traces," ACM COMM, pp. 293–304, Aug. 1992.
Rotenberg et al., "Control independence in trace processors," IEEE, pp. 4–15, 1999.
Gertner et al., "High level debugging in parasight," DARPA, pp. 151–162 No Publication Date.
Shende et al., Event and state based debugging in TAU: a prototype,: ACM SPDT, pp. 21–30, 1996.
Wismuller, "Debugging of globally optimized programs using data flow analysis," ACM SIGPLAN, pp. 278–289, 1994.
Sameer Shende, et al. "Event and State–Based Debugging in TAW: A Prototype" *SPDT '96 Philadelphia PA, USA*. 1996 ACM 0–89791–846–0/96/05 pp. 21–30.
Roland Wisüller, et al. "Debugging of Globally Optimized Programs Using Data Flow Analysis" *SIGPLAN 94–6/94 Orlando, Florida USA*. 1994 ACM 0–89791–662–x94/0006 pp. 278–289.

* cited by examiner

*Primary Examiner*—Antony Nguyen-Ba
(74) *Attorney, Agent, or Firm*—Moore and Van Allen PLLC; Gregory A. Stephens

(57) ABSTRACT

The present invention is a tracepoint debugging system in which instructions and displays to and from the user are represented using programming abstractions. This aids in the users' understanding of the collected tracepoint data. Additionally, the system can evaluate arithmetic expressions at the target system in order to determine addresses of data which is to be stored into the tracepoint buffer. This can reduce the amount of data required to be stored in the tracepoint buffer.

17 Claims, 4 Drawing Sheets

DEBUGGER SYSTEM USING TRACEPOINTS FOR COMPUTER SOFTWARE

This application is a continuation, divisional, of application Ser. No. 09/144,184, filed Aug. 31, 1998 now abandoned.

BACKGROUND OF THE INVENTION

1. Field of the Invention

The present invention generally relates to debugger systems for computer software.

2. Description of the Prior Art

During the coding of computer programs, the inadvertent production of errors, or bugs, is typically unavoidable. Debugging systems help identify, and thus eliminate, these bugs from a computer program.

One tool used with debuggers are breakpoints. Breakpoints are stopping locations in a computer program under test. The computer program will run until it reaches a predetermined breakpoint address; control is then returned to the debugger. At this point, the debugger can examine the memory locations used by the computer program under test. By examining these memory locations, the user can locate and eliminate bugs in the computer program under test.

There are difficulties with breakpoints, however. For example, some computer systems are parts of systems in which the computer system under test provides and receives data from another part of the system within a certain time restriction. The breakpoints can thus cause timing problems. Sometimes it is not feasible for the computer user to be around during the testing of the computer system. For example, if a breakpoint is set at a location where it is unlikely for the program to hit, it would not make sense for the computer user to sit at the computer screen waiting for such an unlikely event. Additionally, some testing of the computer system can occur late at night when the software engineers are not available.

One way to avoid these problems is through the use of tracepoints. Tracepoints are similar to breakpoints, but unlike breakpoints, they do not stop the program indefinitely. Once the program reaches a tracepoint, data in predetermined memory locations are stored. Control is then returned to the computer program under test. After the computer program has run, a "hex dump" of all the data obtained by the tracepoints is provided to the user. The user sifts through the hexadecimal representation of the data in order to determine the bugs in the computer system. It is desired to have an improved tracepointing system for examining a computer program under test.

SUMMARY OF THE PRESENT INVENTION

One embodiment of the present invention relates to the use of programming abstractions to represent the tracepoint output as well as the data to collect at each tracepoint event. This makes it easier for the user of the debugging system to collect and evaluate the tracepoint event data. The user does not have to sift through the hexadecimal representations in order to determine the locations of and contents of memory. For example, if a variable, X, is used in the source code of the computer program under test, the debugger system can interpret the user's command "collect X" at a given tracepoint to collect the data stored in the memory location associated with the variable, X. Later, an instruction to "print X" will cause the debugging software to display the value of X. The user need not look up the address of variable X, then look at the contents of that address; the debugger system does this automatically for the user.

In a preferred embodiment, the system can collect data from the stack and then produce an output indicating what subroutine called which, and with what arguments, at the time of the tracepoint event.

In a preferred embodiment, the debugger system uses a programming abstraction, such as a variable used in the source code of the program under test, and checks the address and symbol table created during the compiling of the computer program under test to determine some indication of the addresses of the required data. This indication is sent to a debugger agent (a subprogram running on the target system that provides services for the debugger on the host computer) along with the computer program under test. The debugger agent in the target system collects the desired data and stores the data into a buffer when a tracepoint is executed. After the computer program under test has run, the debugger system can send a request to the debugger agent on the target to obtain the data in the buffer. The debugger can then represent the data using programming abstractions. In a preferred embodiment, both the collection and display representations of the data uses the symbol and address table created by the compiler for the compiled program under test.

In another embodiment of the present invention, the system includes bytecode expressions that are run as part of the tracepoint collecting of data at the target system. The target system can evaluate expressions in order to determine the data to collect. For example, consider an array Q[n] which has 100 elements. If the user wants to collect the data in the location Q[X+Y], where X and Y are both program variables, the present invention can evaluate X+Y in order to determine the address location of the array value Q[X+Y] in order to obtain this value and store it in the buffer. In this way, less data need be stored. For example, if only the element Q[X+Y] is required, the system need not store all 100 elements of the array each time the tracepoint is hit. This is an important consideration because the data storage capacity of the buffer at the target system is an important limiting factor. A given tracepoint could be hit a large number of times. By using bytecode expressions, the buffer is not filled with unwanted data. and thus filled prematurely.

Having the arithmetic expression evaluated at the target system rather than at the debugger is important. In breakpoint systems, typically the evaluation of expressions is done at the debugger. This is undesirable when using tracepoints that operate in real time because the arithmetic calculations of the expressions at the target system can occur much faster than the data transfer between the target system and the host system. For the same reason, the debugger agent stores the data into a buffer, rather than sending the data directly to the host system at the time of a tracepoint event.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENT

Figure 1:
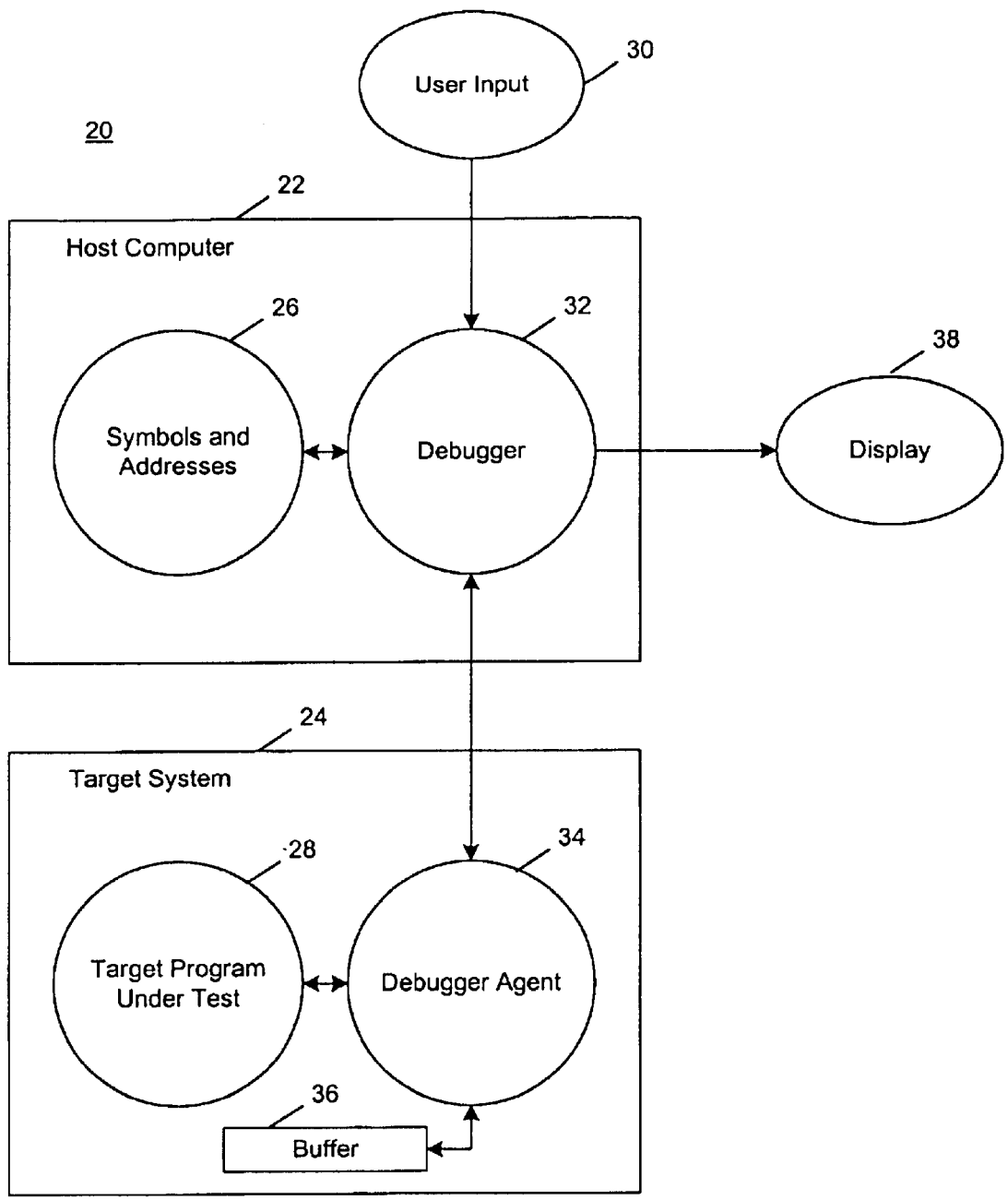
FIG. 1 is a diagram illustrating the host computer and the target system.

FIG. 1 shows an example of a system 20 of the present invention. The system 20 includes a host computer 22 and a target system 24. The host computer 22 is typically a workstation or personal computer. The target system 24 is typically an embedded system.

The user input 30 is a representation of the tracepoints and the data requested to be collected at the tracepoint. The user input is expressed using programming abstractions, such as symbols, variables, and expressions, in addition to register and address numbers. Programming abstractions are defined as symbolic representations that exclude purely numeric representations such as hexadecimal representations of address. As will be discussed below, the programming abstractions can include symbols and addresses contained in the symbol and address table 26 which is produced during the compiling of the target program. The debugger 32 interprets the programming abstractions to produce a description of the address of the tracepoints and the data to be collected. This description is then sent to the debugger agent 34 on the target system 24.

The debugger agent 34 produces the tracepoint links into the target program 28. Program code for storing data into the memory 36 when a tracepoint event occurs is contained in the debugger agent 34 as well. The debugger agent 34 can execute bytecode for doing arithmetic operations. These bytecodes allow the debugger agent 34 to calculate addresses of data to be stored.

During the operation of the target program 28, when a tracepoint is reached, control is given to the debugger agent 34. The debugger agent 34 can calculate the addresses of the data to be collected and store this data into the buffer 36. After target program has run, the user can input a request to find the data associated with a given tracepoint event. This request can use programming abstractions. The request is sent to the debugger 32 and interpreted using the symbols and address table 26. The debugger then instructs debugger agent 34 to get the desired data from the buffer. The data is interpreted and then displayed in display 38.

Figure 2:
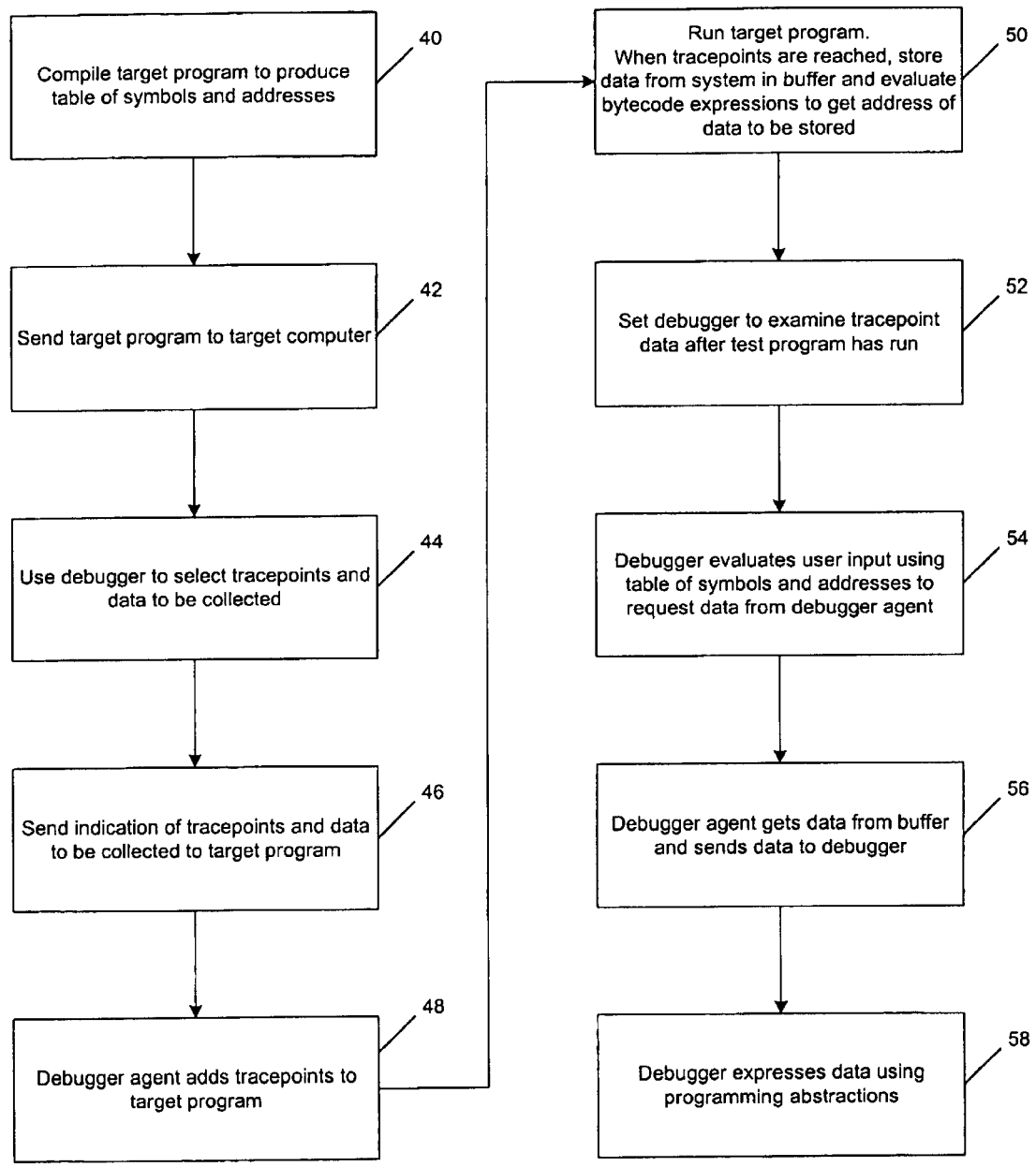
FIG. 2 is a flow chart illustrating a method of the present invention.

FIG. 2 is a flow chart illustrating a method of the present invention. In step 40, a target program is compiled to produce the table of symbols and addresses. The production of the table of symbols and addresses during the compiling of a computer program is well known.

In step 42, the target program is sent to the target computer. In step 44, the debugger is used to produce the description of the tracepoints and the data that is to be collected at that tracepoint. This description is sent to the target program in step 46. In step 48, the debugger agent adds the tracepoints to the target program. An instruction in the tracepoint location is removed from the target program, and replaced by a jump to a portion of the debugger agent.

In step 50, the target program is run. When the tracepoints are reached, some of the program registers can be saved, any arithmetic expressions are evaluated, and then data is saved into the buffers. Next, the registers are returned to their original condition. The written over instruction in the first location is replaced and executed and the jump written back.

Arithmetic expressions may be evaluated at the target computer to get the addresses of the data to be stored. After running the target program, the debugger can be set to examine the tracepoint data in step 52. In step 54, the debugger evaluates the user input using the table of symbols and addresses to request data from the debugger agent.

Looking at FIG. 2B, in step 56, the debugger agent gets data from the buffer and sends it to the debugger. In step 58, the debugger uses programming abstractions to expresses the requested data associated with a tracepoint event.

Figure 3:
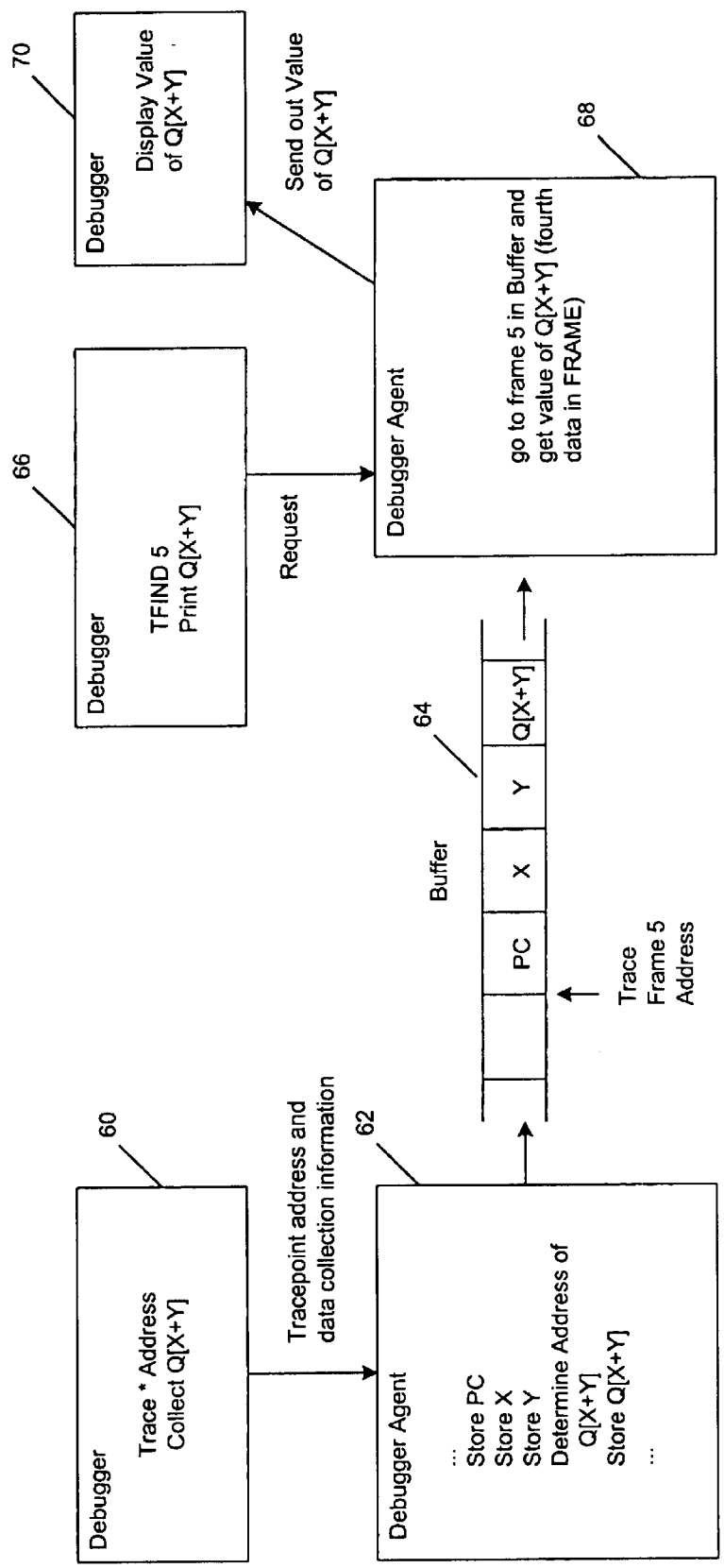
FIG. 3 is a diagram illustrating an example of the operation of the system of the present invention.

FIG. 3 illustrates an example of the operation of the system of the present invention. The user inputs the tracepoint location and the data that is desired to be collected, as shown in block 60. A representation of the tracepoint location and the data to be collected in sent to the debugger agent. The debugger agent will produce a table of locations 62 of data to store in the buffer 64, such as the variables X, Y, and Q[X+Y]. The location of Q[X+Y] requires a calculation of the value, X+Y, to determine an offset into the array starting address and point to the array element to be stored. In one embodiment, the PC is automatically stored in the first location of the buffer at the start of a tracepoint. In this example, the second location of the frame stores the value X, the third location stores the value Y, and the fourth location stores the value of Q[X +Y], the third location stores the value Y, and the fourth location stores the value of Q[x +Y]. In block 66, the user input "tfind5", sets the trace frame to frame 5. The request "print Q[X+Y]" is interpreted and instructions are sent to the debugger agent, which goes to frame 5 in the buffer and gets the value of Q[X+Y], which is the fourth data in the frame 5, as shown in block 68. Note that user request "print Q[X+Y]" includes the programming abstraction Q[X+Y]. In block 70, the debugger displays the value of Q[x+Y].

The buffer 64 is typically of a fixed size, and is divided into frames. The frames are used to store the data collected at each tracepoint event. The frames are of variable size since a different amount of data can be collected at each tracepoint.

In one embodiment, the user can preselect whether no more tracepoint data is collected when the buffer is full or whether the system wraps-around, overwriting parts of the buffer. If the system does not write over buffer data, only the first set of tracepoint data is available. If the system wraps-around the buffer, only the last set of tracepoint data is available.

As shown in FIG. 3, the system can be set up to automatically collect the program counter (PC) at the tracepoint. The system could also be set up to automatically collect other useful data, such as the stack pointer.

During the readback, the frame can be set by the number, as shown in block 66, or by the value of the program counter at the tracepoint. The system can also allow searching of the buffer for a given frame. For example, a frame where X=4, or the second frame storing data for a given tracepoint can be found.

Figure 4A:
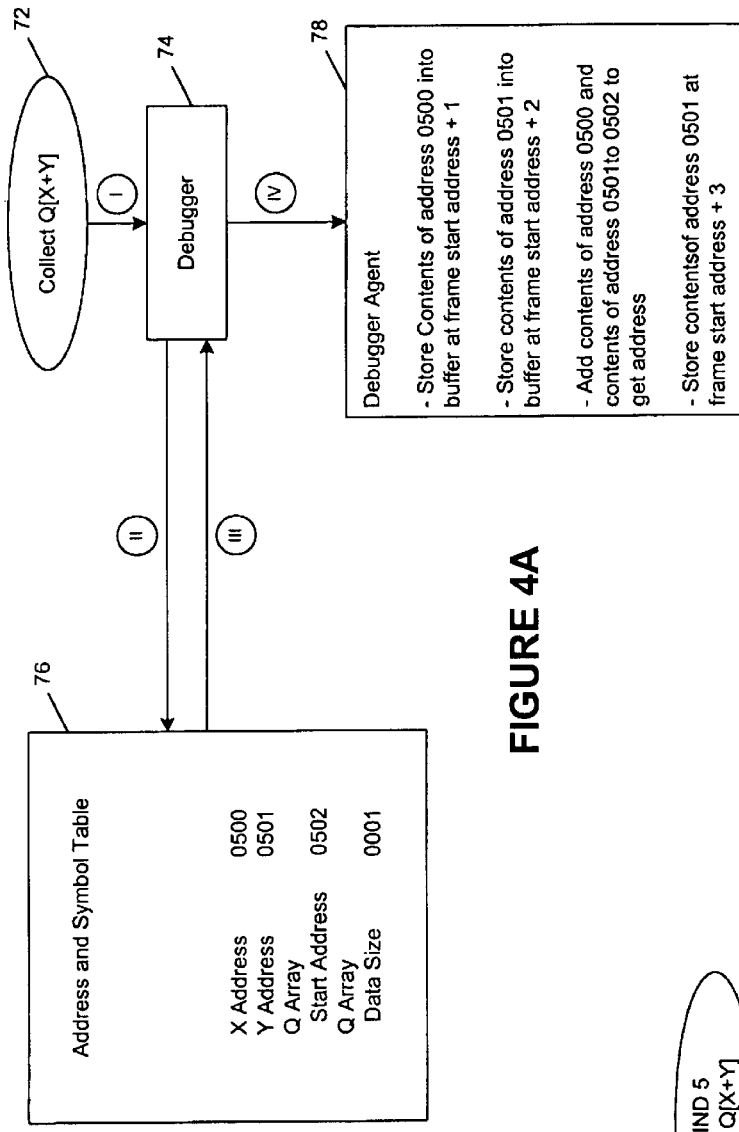
FIGS. 4A and 4B are diagrams illustrating-details of the example of FIG. 3.
Figure 4B:
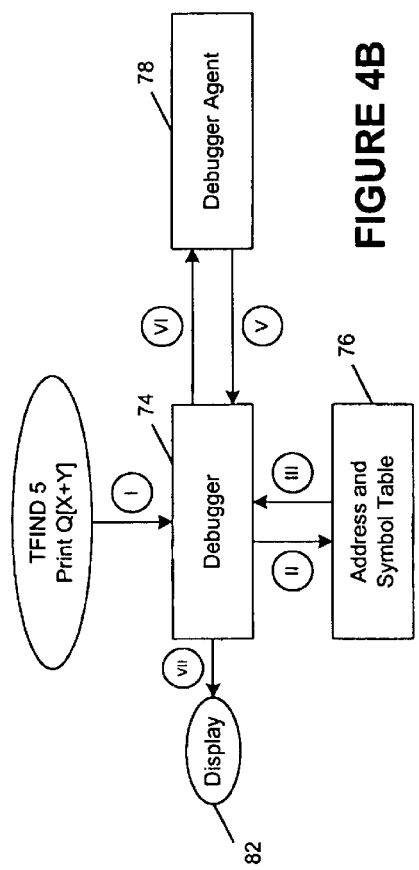

FIGS. 4A and 4B illustrates details of the example of FIG. 3. FIG. 4A illustrates evaluating of the user requests. In block 72, the request for collecting Q[X+Y] is created. This is sent to the debugger 74 which evaluates the symbol and address table 76. The debugger 74 then sends instructions to the debugger agent 78. The debugger agent then produces a table of memory locations from which data is to be obtained to store in the buffer. For example, "store the contents of address 0500 into the buffer at the frame start address +1". This will cause the value of X to be stored in the buffer. In the next step, the contents of address 0501 is stored into the buffer at frame start address +2. In the next step. the contents of the address 0500 and the contents of address 0501 are added to the contents of address 0502 to get the address of the desired array location. Note that if the array data size was greater than one, the contents of the addresses 0500 and 0501 would be multiplied by this array data size. In the next step, the contents of the address, the array data, is stored at the frame start address +3.

Looking at FIG. 4, the user can set the frame of the buffer to five, and request the data "Q[X+Y]". This will cause the debugger 74 to check the address and symbol table 76 and request the values for X and Y, addresses 0500 and 0501. at the fifth frame. The debugger agent will pull the X and Y values from the buffer and send this data to the debugger. The debugger will use the values of X and Y to calculate the address of Q[X+Y], and request that the debugging agent provide the contents of this address. The debugger agent 78 sends value of Q[X+Y] contained in the fourth data element of frame 5, to the debugger 74. The debugger 74 displays the value of Q[X+Y] in step 82. Note that programming abstractions, such as the variables, can be used in both the input and display of the tracepoint data.

The system preferably has a collect mode that conveniently allows for the subroutine call stack to be collected when a tracepoint is hit. In this preferred embodiment, the system determines from the collected call stack which program called which, and what were the arguments sent. In a similar manner to that described with respect to FIG. 3, the debugging system can use a representation of the program calls and their arguments, using programming abstractions, without requiring the user to sift through a hexadecimal representation of data.

In addition to arrays, records can be stored and displayed at a tracepoint event. Records are a programming abstraction of an arrangement of multiple data structures grouped. All or portions of the record can be stored and displayed by the system.

In another embodiment of the present invention, the system will allow step-through instructions. Step-through instructions will cause the system to produce a number of tracepoint events in a row, collecting a set of data at each tracepoint. For example, the next n instructions executed can be replaced with a tracepoint. This will allow the programmer to step through the tracepoints to show the memory values at consecutively executed instructions. This can be done even though the actual program is long finished. An advantage that is not possible with breakpoints is that the step-though operation for tracepoints will allow the user to step backwards. This isn't done with breakpoints, because it is difficult to reset the state of the computer once an operation has occurred.

In a preferred embodiment, the debugger system allows for breakpoints as well as the tracepoints, and the input and display are similar for both the breakpoints and the tracepoints.

Appendix I illustrates additional examples of how the tracepoint system of the present invention operates. In particular, Appendix I describes one embodiment of the interface of the present invention used in the GNU symbolic debugger.

Consider an example of how the debugging system of the present invention with the tracepoints operates. To test for year 2000 problems, an experiment can be run in which the clock can be run past the year 2000, and it is checked what happens to the software, such as phone switch software. The system can be set up with the tracepoints, and then run late at night with no software engineer around so that the phone switch system can be run during the day. In the morning, long after the experiment is over, a software engineer can examine the data collected by the tracepoints, and then determine what happened during the operation of the program.

The advantage of storing the data in a buffer at the target system is that the system can quickly store the data required. If, for example, a system is required to send the data to the host, this can change the timing of the host program and cause serious errors, or might actually cause the program to behave correctly when in fact, during the actual operation during the year 2000, errors will occur.

It will be appreciated by those of ordinary skill in the art that the invention can be embodied in other specific forms without departing from the spirit or essential character thereof. The presently disclosed embodiments are therefor considered in all respects to be illustrative and not restrictive. The scope of the invention is indicated by the appended claims, rather than the foregoing description, and all changes which come within the meaning and range of equivalence thereof are intended to be embraced therein.

What is claimed is:

1. A method of debugging a target program on a target system using a host computer, comprising:

providing a target program under test on the target system;

providing a debugger program on the host computer, the host computer being separate from the target system;

using the debugger program in the host computer to select tracepoints for the target program under test;

in the host computer, indicating, using programming abstractions, the subset of the target program's data and machine state to store at a tracepoint execution event;

in the host computer, converting the programming abstractions into instructions to collect the subset of a target program's data and machine state at the tracepoint execution event;

in the target system, recording the selected subset of the target program's data and machine state at the tracepoint execution event during the running of the target program under test; and in the host computer, displaying the recorded data using programming abstractions.

2. The method of claim 1, wherein the converting step comprises producing descriptions of the data to collect from the programming abstractions and sending the descriptions to a debugger agent on the target system which produces the instructions.

3. The method of claim 1, wherein the converting step includes using a symbol and address table created by the compiler for the program under test.

4. The method of claim 1, wherein the programming abstractions include variables and symbols.

5. The method of claim 4, wherein the programming abstractions further include arithmetic expressions.

6. The method of claim 4, wherein the data to be stored is further represented by registers and address numbers.

7. The method of claim 1, wherein the instructions include bytecode making arithmetic calculations at the target system to determine the data to collect.

8. The method of claim 1, wherein the tracepoints are selected using programming abstractions.

9. The method of claim 1, wherein a symbolic debugger is used to specify tracepoints in the test program and interpret the programming abstractions, the symbolic debugger being adapted to set breakpoints, wherein the displaying step is such that the symbolic debugger displays the tracepoint data consistent with the display of breakpoint data.

10. The method of claim 1, wherein the displaying step includes user inputting a programming abstraction and the system displaying a value of that programming abstraction at the time of a tracepoint event of a selected tracepoint.

11. A method of debugging a target program on a target system using a host computer, comprising:

provided a target program under test on the target system;

providing a debugger program on the host computer, the host computer being separate from the target system;

in the host computer, selecting tracepoints for the program under test;

selecting a subset of a target program's data and machine state to store at a tracepoint execution event, the selected subset of data including at least one data element whose address depends on a variable whose value changes during the target program's execution;

sending instructions to collect the subset of a target program's data and machine state at the tracepoint execution event; and in the target system, recording the selected subset of the target program's data and machine state at the tracepoint execution event during the running of the target program under test, wherein the recording step includes calculating the address of the at least one data element at the tracepoint event, the recording step not involving data transfers between the host computer and the target system at the time of the tracepoint event.

12. The method of claim 11, further comprising displaying the recorded data using programming abstractions.

13. The method of claim 12, wherein a symbolic debugger is used to specify tracepoints in the test program and interpret programming abstractions that indicate the tracepoints and the data to collect, the symbolic debugger further being adapted to set breakpoints, wherein the displaying step is such that the symbolic debugger displays the tracepoint data consistent with the display of breakpoint data.

14. The method of claim 13, wherein the symbolic debugger includes using a symbol and address table created by the compiler for the program under test.

15. The method of claim 11, wherein the recording step is such that the at least one data element is an element of an array that is pointed to by an expression including at least one variable.

16. The method of claim 11, wherein the selecting steps are done using a symbolic debugger.

17. The method of claim 11, wherein the tracepoints are selected using programming abstractions.

* * * * *